US012687288B1

(12) United States Patent
Albo

(10) Patent No.: US 12,687,288 B1
(45) Date of Patent: Jul. 21, 2026

(54) LUMINAIRE FOR MOUNTING IN A PANEL

(71) Applicant: ABL IP Holding, LLC, Atlanta, GA (US)

(72) Inventor: Charles Albo, Arvada, CO (US)

(73) Assignee: ABL IP Holding, LLC, Atlanta, GA (US)

( * ) Notice: Subject to any disclaimer, the term of this patent is extended or adjusted under 35 U.S.C. 154(b) by 0 days.

(21) Appl. No.: 19/078,819

(22) Filed: Mar. 13, 2025

(51) Int. Cl.
*F21V 31/00* (2006.01)
*F21S 8/02* (2006.01)
*F21V 21/04* (2006.01)
*F21V 23/00* (2015.01)

(52) U.S. Cl.
CPC ............ *F21V 31/005* (2013.01); *F21S 8/026* (2013.01); *F21V 21/04* (2013.01); *F21V 23/003* (2013.01)

(58) Field of Classification Search
CPC ............. F21S 8/022; F21S 8/024; F21S 8/026
See application file for complete search history.

(56) References Cited

U.S. PATENT DOCUMENTS 9,598,867 B1 * 3/2017 Conklin ................ F21S 19/005
2010/0202136 A1 * 8/2010 Vittozzi ............... B60Q 1/2615 362/183
2010/0259938 A1 * 10/2010 Schenk ................. F21V 31/005 362/307
2014/0313774 A1 * 10/2014 Myers .................. G02B 6/0085 362/249.02
2015/0338084 A1 * 11/2015 Ryder ..................... F21V 17/12 362/365
2017/0311469 A1 * 10/2017 Anderson, III .......... H04B 1/08
2021/0332954 A1 * 10/2021 Wen .......................... F21K 9/61

OTHER PUBLICATIONS

Top Access Cleanroom Walkable Luminaire: KL-WALKF-LED, REV: Dec. 18, 2024, Kurtzon, 1420 S. Talman Ave., Chicago, IL 60608, Accessed on Jul. 22, 2025, https://www.kurtzon.com/SPECS/CLEANROOM/L/KURTZON_SPEC_KL-WALKF-LED.pdf, 2 pages.

* cited by examiner

*Primary Examiner* — Christopher E Dunay
(74) *Attorney, Agent, or Firm* — Secant IP, PLLC

(57) ABSTRACT

A luminaire including a lower assembly including a lower flange and a lower wall extending from the lower flange and an upper assembly including an upper flange and an upper wall extending from the upper flange. The lower flange is placed in tension against a side, e.g., a bottom, of a ceiling panel by coupling with a hanger having a hanger flange disposed on an opposite side, e.g., a top, of the panel. The lower wall extends into an opening in the panel. The upper flange is positioned adjacent the opposite side of the panel with the upper wall extending into the opening. The lower wall and upper wall are vertically adjustable relative to each other to adjust a thickness of the luminaire to allow the luminaire to be installed in panels having a range of thicknesses.

18 Claims, 8 Drawing Sheets

LUMINAIRE FOR MOUNTING IN A PANEL

TECHNICAL FIELD

The present application relates to lighting, and more particularly, to a luminaire for mounting in a panel.

BACKGROUND

Controlled environments such as clean rooms, containment areas, surgical suites, locations containing hazardous materials, etc. are often constructed using panels, such as insulated metal panels (IMPs). These panels may be used to construct a ceiling, wall and/or floor of the controlled area, and are available in a variety of different nominal thicknesses. In some instances, luminaires installed in these panels have an associated fixed thickness configured to specifically match the nominal thickness of the panel in which the luminaire to be installed. Expandable panels configured to fit a variety of panel nominal thicknesses are known but have not yet provided desirable features in a convenient configuration.

Also, it is often important to prevent contaminants from entering or leaving a containment environment and/or to provide access to the luminaire or the space outside of the controlled environment for repair, maintenance, upgrades, retrofits, etc. Known panel-mounted luminaires have yet to provide these features in a convenient configuration.

Figure 1:
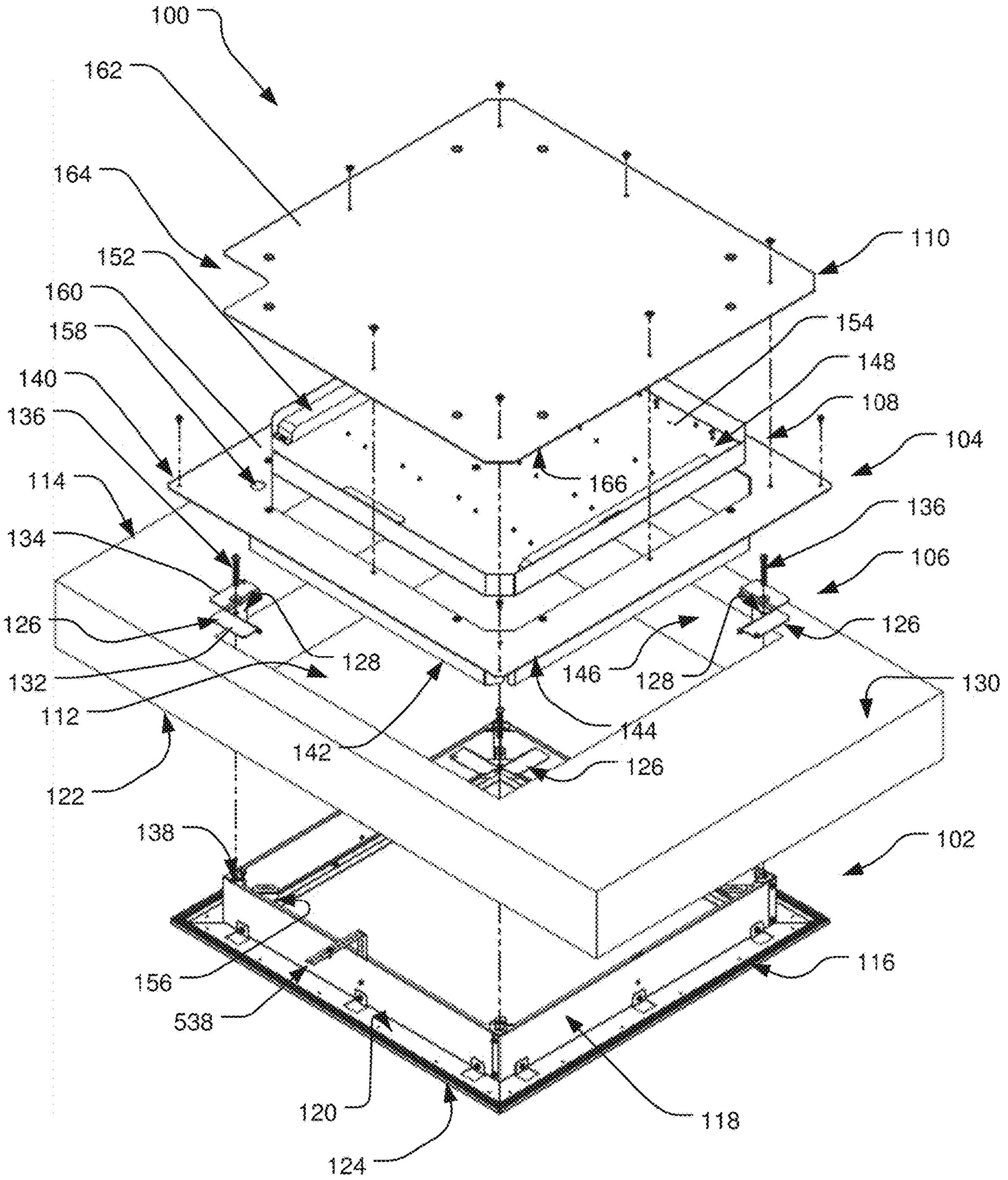
FIG. 1 is an exploded view of one example of a luminaire consistent with the present disclosure.
Figure 2:
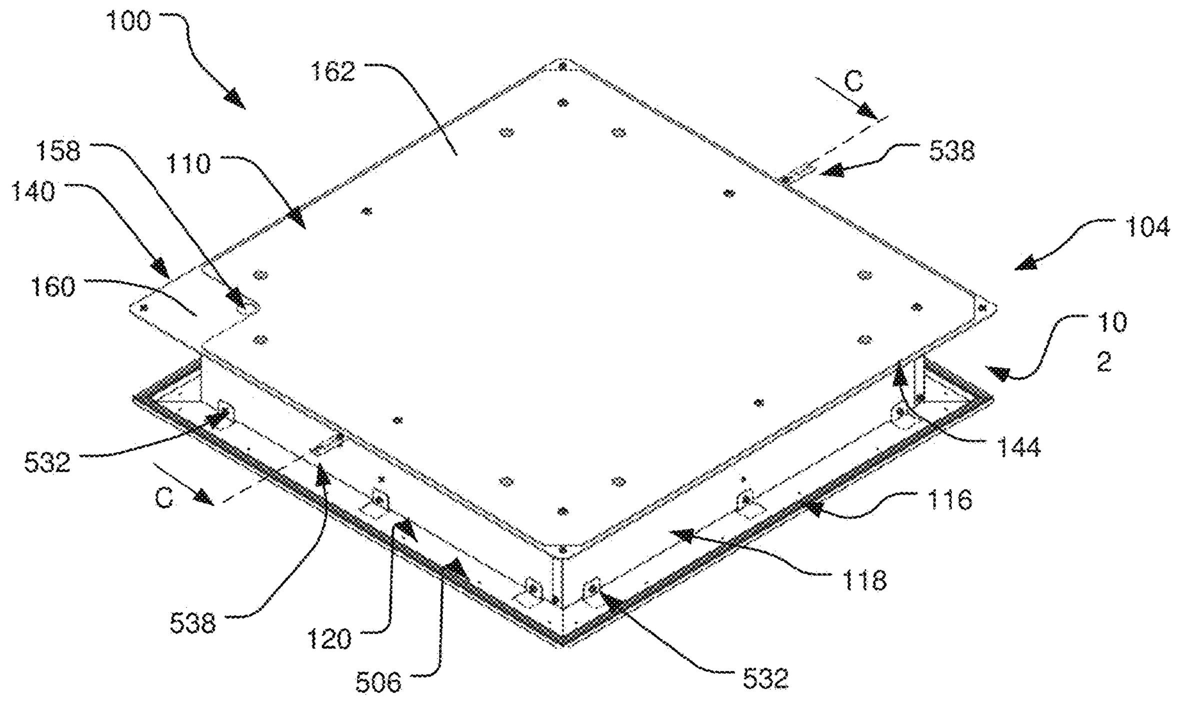
FIG. 2 is a top perspective view of the luminaire shown in FIG. 1.
Figure 3:
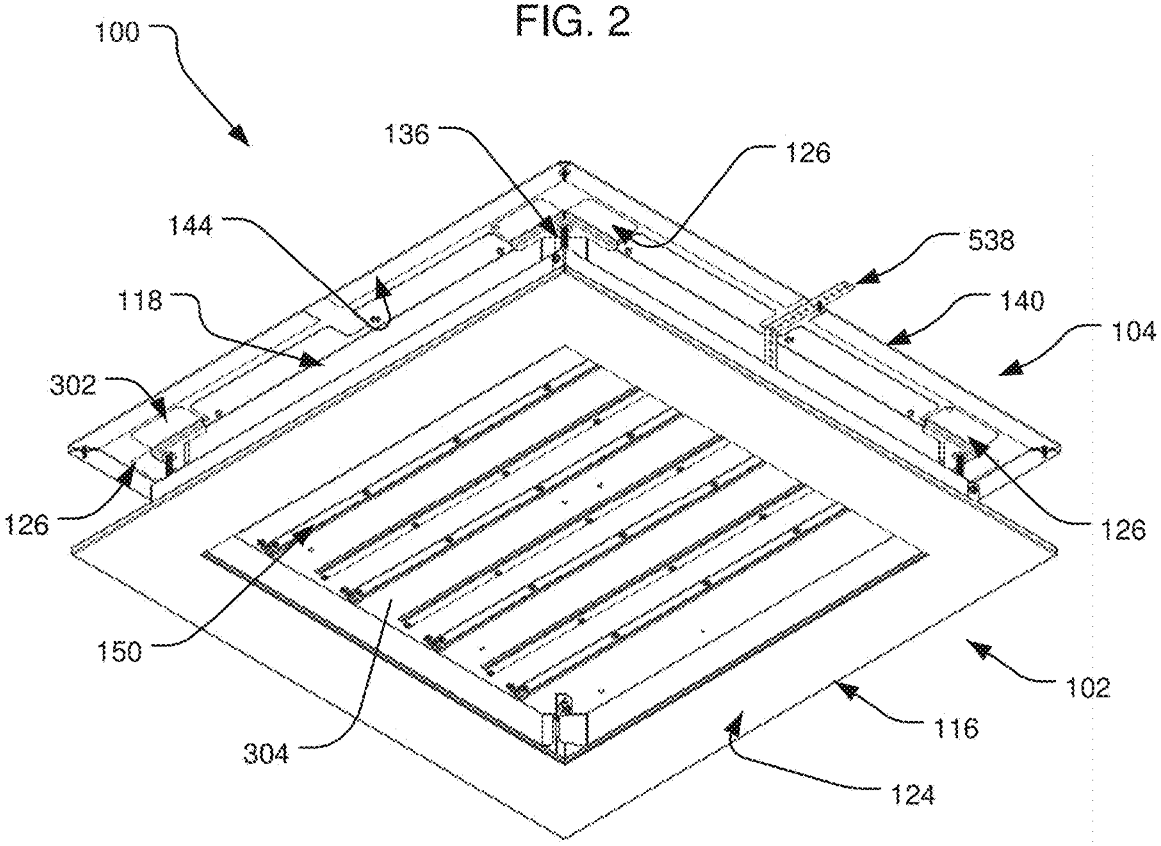
FIG. 3 is a bottom perspective view of the luminaire shown in FIG. 1.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

In accordance with an embodiment of the present disclosure, there is disclosed a luminaire for mounting in a panel. In some embodiments, luminaire may include a lower assembly and a separate upper assembly that are vertically adjustable relative to each other providing a continuously adjustable luminaire thickness. This allows mounting of the luminaire in panels having a range of nominal thicknesses. In some embodiments, for example, luminaires consistent with the present disclosure are adjustable in thickness to allow mounting of the luminaires in panels ranging from about 60-200 millimeters (mm) in thickness. For example, one luminaire consistent with the present disclosure may be configured for mounting in panels ranging from about 60-120 mm and another luminaire consistent with the present disclosure may be configured for mounting in panels ranging from 120-200 mm. This allows construction of containment environments using panels of multiple nominal thicknesses and using a single luminaire configuration, thus reducing the number of components required for construction and the inventory of spare parts.

In some embodiments, a luminaire consistent with the present disclosure may have a lid that provides a walkable surface at the exterior of the containment environment. For example, when a luminaire consistent with the present disclosure is installed in a ceiling panel, the lid may have a top surface, i.e., in a space above the ceiling, having a load rating that allows a person to walk on the top surface at all thicknesses of the luminaire. The luminaire may also only minimally extend upward from the top surface of the ceiling panel. This allows the luminaire to function as a floor surface in the space above the ceiling whereby a person may walk on the top surface of the lid without tripping on the edges luminaire for performing maintenance and repair of systems installed in the space above the ceiling.

In some embodiments, a luminaire consistent with the present disclosure may include one or more gaskets between the lower assembly and the bottom surface of the panel to complete the clean room envelope when the luminaire is fully installed. In some embodiments, a luminaire consistent with the present disclosure may include continuous flanges top and bottom surfaces of the panel that contain dust and particulate shed from the panel, e.g., the foam core of IMPs, and shield personnel from sharp metal edges along the perimeter of the opening in the panel in which the luminaire is installed. In some embodiments, a luminaire consistent with the present disclosure has a lower assembly mounted in an opening in the panel using a hanger. This allows the lower flange of the luminaire inside the clean room envelope to be configured with no perforations or penetrations for securing hardware that would act as a conduit for contaminants entering the containment environment.

In some embodiments, a luminaire consistent with the present disclosure allows for access to electrical components of the luminaire from the top surface of the luminaire at the exterior of the containment environment. This allows for repair, maintenance, upgrades, retrofits, etc., to the luminaire to be performed from outside of the containment environment, avoiding breach of the containment environment when performing repair, maintenance, etc., and avoiding disruption to activity within the containment environment and possible contamination that would otherwise by introduced by ladders, lifts or hoists to reach the luminaire. Also, the lack of perforations or penetrations through the lower flange of the luminaire avoids contamination of the containment environment by contaminants passing through the lower flange.

A luminaire consistent with the present disclosure thus includes several advantageous features. Example embodiments shown and described herein may include all of these features, and other advantageous features, in combination. It is to be understood, however, that a luminaire consistent with the present disclosure may include any one or more of the features described herein, or any combination of two or more of the features described herein. The example embodiments described herein are thus provided by way of illustration, not of limitation.

FIGS. 1-4 illustrate one example of a luminaire 100 configured in accordance with an embodiment of the present disclosure. As shown, the illustrated example luminaire 100 includes a lower assembly 102, an upper assembly 104, one or more hangers 106, an electronics tray 108, and lid 110. The luminaire 100 is configured for mounting in an opening 112 of a panel 114 of a controlled environment.

The illustrated example embodiment will be described herein as being configured for mounting in a ceiling panel 114 of a controlled environment. It is to be understood, however, that a luminaire 100 consistent with the present disclosure may be installed in a panel 114 forming any portion e.g., a ceiling, a wall, floor, door, etc., of a controlled environment or in a panel other than a panel 114 used for controlled environments.

The ceiling panel 114 may be, for example, an insulated metal panel (IMP). In other embodiments, the ceiling panel 114 may be constructed from a vinyl rock gypsum, vinyl rock wool, fiberglass-reinforced plastic, aluminum, polycarbonate, polypropylene, stainless steel, a powder-coated steel, or any other material useful in forming ceiling panels. Also, the ceiling may be a drop ceiling, a flat ceiling or any other ceiling configuration.

In describing the illustrated embodiments, the directions up and down, upward and downward, upper and lower, top and bottom, interior and exterior, as well as above and below, and are with reference to a ceiling in a controlled environment. The luminaire 100 is installed a ceiling panel 114 that forms a part of the ceiling and is substantially horizontal with the controlled environment below the luminaire 100 and a space separated from the controlled environment above the luminaire 100. The term outward refers to a direction from the interior of the luminaire 100 toward the exterior of the luminaire 100.

In the illustrated example embodiment, the opening 112 in the panel 114 and the luminaire 100 are generally square in shape. It is to be understood that a luminaire 100 consistent with the present disclosure may be provided in a variety of sizes and shapes, including but not limited to rectangular, circular, and other regular or irregular geometric shapes.

Figure 4:
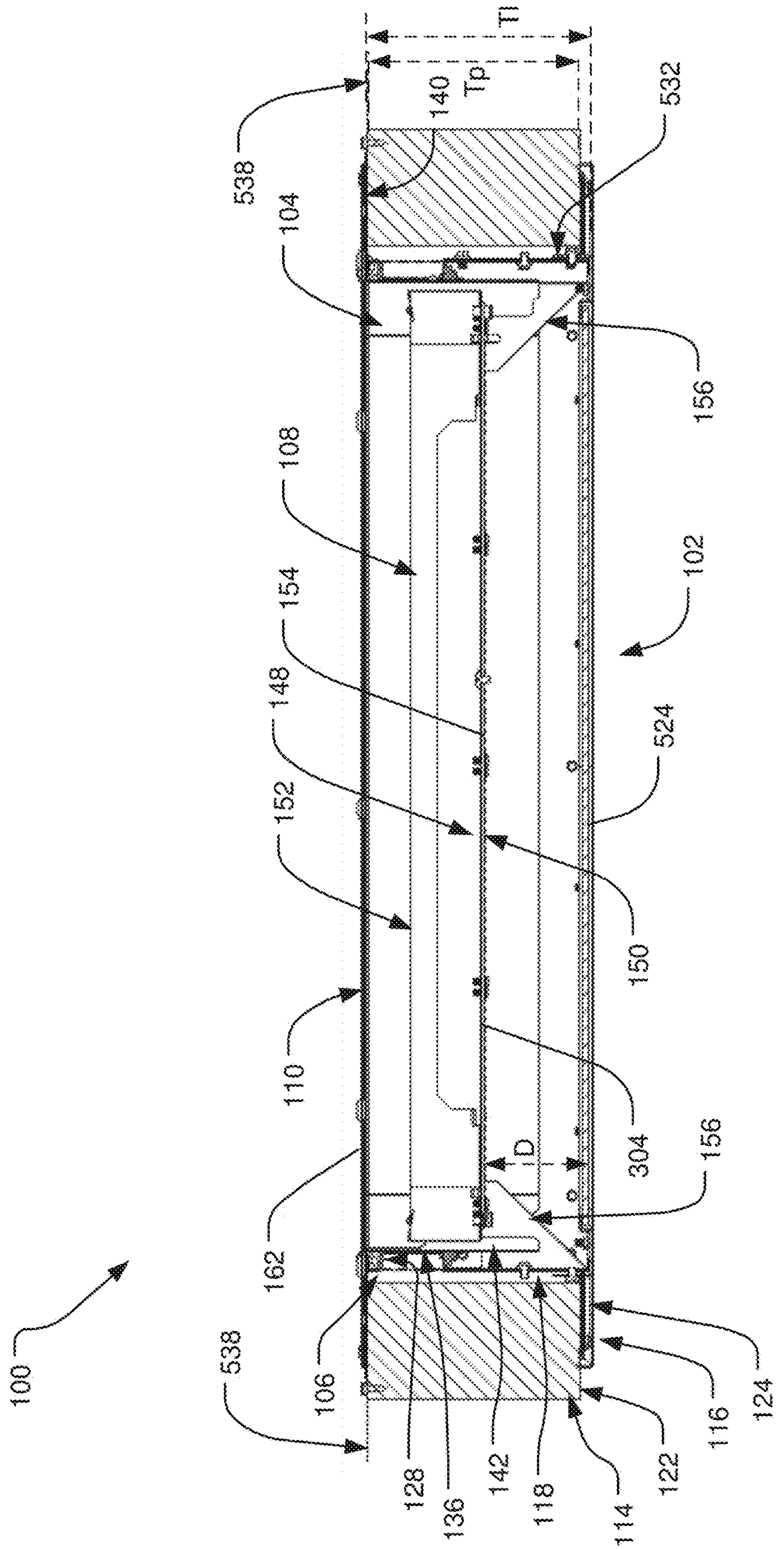
FIG. 4 is sectional view of the luminaire shown in FIG. 1 taken along lines C-C in FIG. 2.

With particular reference to the exploded view of FIG. 1 and the sectional view of FIG. 4, in the illustrated example embodiment, the lower assembly 102 includes a lower flange 116 and a lower wall 118 extending around the perimeter of the lower flange 116. The lower flange 116 has a top surface 120 for positioning against a bottom surface 122 of the of the ceiling panel 114 and around a perimeter of the opening 112 in the ceiling panel 114. The bottom surface 124 of the lower flange 116 is visible from the containment area.

The lower wall 118 extends upwardly from the top surface 120 of the lower flange 116 at substantially at a right angle to the lower flange 116 and around the perimeter of the lower flange 116. The lower wall 118 is configured to extend upwardly into the opening 112 in the ceiling panel 114 around the perimeter thereof.

Each of the hangers 106 includes a hanger flange 126 and a hanger fastener mount 128. The bottom surface 302 (FIG. 3) of the hanger flange 126 is configured to rest on the top surface 130 of the panel 114. In the illustrated example embodiment, the hanger 106 and the hanger flange 126 are configured to fit in a corner of the opening 112 in the panel 114 and the hanger flange 126 has first 132 and second 134 legs disposed at substantially a right angle to each other. It is to be understood, however, that the hanger flange 126 can be configured for positioning along any portion, of the opening 112 and may be configured depending on the shape of the opening 112, e.g. the hanger flange 126 may be arcuate when the opening is circular or have an angle other than 90 degrees between the first 132 and second 134 legs of the hanger flange 126 when the opening is a polygon with sides at angles other than 90 degrees to each other.

The hanger fastener mount 128 extends inwardly and downwardly from the hanger flange 126 and is positioned in the opening 112 of the panel 114 below the top surface 130 of the panel 114. The hanger fastener mount 128 is configured to receive a hanger fastener 136 extending downwardly toward the lower assembly 102. The hanger fastener 136 is configured to engage, e.g., through mating threads, an associated lower wall fastener mount 138 extending inwardly from the lower wall 118 and within the opening 112 in the panel 114.

Engagement, e.g., threaded engagement, of the hanger fastener 136 with the hanger fastener mount 128 and the lower wall fastener mount 138 draws the hanger flange 126 against the top surface 130 of the panel 114 and draws the top surface 120 of the lower flange 116 against the bottom surface 122 of the ceiling panel 114. The lower flange 116 is thus placed in tension against the bottom surface 122 of the ceiling panel 114. This holds the lower assembly 102 in place with respect to the ceiling panel 114 with the lower flange 116 compressed against the bottom surface 122 of the ceiling panel 114 and the lower wall 118 extending upwardly into the opening 112 in the ceiling panel 114. Advantageously, no fasteners extending upwardly through the bottom surface 124 of the lower flange 116 are required to hold the lower assembly 102 in place with respect to the ceiling panel 114. This avoids the need for penetrations or other fastener openings through the lower flange 116 that would otherwise provide a conduit for contaminants to enter and/or leave the containment environment through the luminaire 100. Also, the hangers 106 roughly center the lower assembly 102 in the opening 112 in the panel 114 during installation.

The upper assembly 104 includes an upper flange 140 and an upper wall 142 extending around the perimeter of the upper flange 140. The upper flange 140 is separate from the lower flange 116. The upper flange 140 has a bottom surface 144 for positioning against the top surface 130 of the of the ceiling panel 114 and around a perimeter of the opening 112 in the ceiling panel 114. The upper wall 142 extends downwardly from the bottom surface 144 of the upper flange 140 at substantially at a right angle to the upper flange 140 and around the perimeter of the upper flange 140. The upper wall 142 is configured to extend downwardly into the opening 112 in the ceiling panel 114 around the perimeter thereof until the bottom surface 144 of the upper flange 140 contacts the top surface 130 of the ceiling panel 114.

In the illustrated example embodiment, the upper wall 142 extends downwardly into the opening 112 in the ceiling panel 114 with an exterior surface of the upper wall 142 in opposed facing relationship with an interior surface of the lower wall 118. The lower wall 118 is thus positioned between the upper wall 142 and an interior surface 146 of the opening 112 in the panel 114. It is to be understood, however, that a luminaire 100 consistent with the present disclosure may be configured with the upper wall 142 positioned between the lower wall 118 and the interior surface 146 of the opening 112 in the panel 114.

In the illustrated example embodiment, once the upper wall 142 is positioned in the opening 112 and the bottom surface 144 of the upper flange 140 is positioned against the top surface 130 of the panel 114, the upper assembly 104 may be secured to the top surface 130 of the panel 114 using one or more fasteners extending through associated openings in the upper flange 140 and into the top surface 130 of the panel 114. It is to be understood however, a luminaire consistent with the present disclosure may include an upper assembly 104 secured to the ceiling panel 114 using fasteners extending through the upper assembly 104 and into the ceiling panel 114 in other locations.

The electronics tray 108 includes a base 148 for supporting lamps 150 and one or more drivers 152 for driving the one or more lamps 150 to emit a desired associated light outwardly from the luminaire 100 through the lower assembly 102. The lamps 150 may be disposed on a bottom 304 of the base 148 and the one or more drivers 152 may be disposed on a top 154 of the base 148. The base 148, for example, may be a printed circuit board assembly (PCBA) including conductive traces and/or wires to electrically couple the one or more lamps 150 disposed to the one or more drivers 152. The features and quantity/density of lamps 150 may be customized, as desired to provide illumination for a given target application or end-use. Numerous suitable configurations will be apparent in light of this disclosure.

In the illustrated example embodiment, the lamps 150 are configured in rows, and are solid-state lamps 150. A given solid-state lamp 150 may include one or more solid-state emitters, either in a common package or separately packaged and clustered together. A given solid state lamp 150 may be any of a wide range of semiconductor light source devices, including but not limited to, for example: (1) a light-emitting diode (LED); (2) an organic light-emitting diode (OLED); (3) a polymer light-emitting diode (PLED); and/or (4) a combination of any one or more thereof. In some embodiments, a given solid-state emitter may be configured for emissions of a single correlated color temperature (CCT) (e.g., a white light-emitting semiconductor light source). In some other embodiments, however, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-amber (RGBA); (3) red-green-blue-white (RGBW); (4) dual-white; and/or (5) a combination of any one or more thereof. As used herein, the term “color” generally is used to refer to a property of radiation that is perceivable by an observer (though this usage is not intended to limit the scope of this term). Accordingly, the term “different colors” implies two different spectra with different wavelength components and/or bandwidths. In addition, “color” may be used to refer to white and non-white light, and where two white lights of varying CCT constitute being a different “color” than each other.

The electronics tray 108 is configured in size and shape to be placed into the opening 112 in the panel 114 and below the top surface 130 of the ceiling panel 114 with the upper wall 142 and the lower wall 118 disposed between the electronics tray 108 and the interior surface 146 of the opening 112. The bottom 304 of the electronics tray 108 may be supported by one or more tray brackets 156 extending inwardly from the lower wall 118. The bottom 304 of the electronics tray 108 may be reflective, or be provided with a reflective coating thereon, for reflecting incident light from the lamps 150 back toward the lower assembly 102 and outwardly from the lower assembly 102.

In the illustrated example embodiment, a tray bracket 156 is provided in each corner of the lower wall 118 to support the electronics tray 108. The tray brackets 156 may additionally, or alternatively, be provided in locations other than the corners of the lower wall 118. An electrical input power source may be coupled to the one or more drivers 152 with one or more power cables extending from the power source and passing through an opening 158 in the upper flange 140 and to the one or more drivers 152.

Once the electronic tray is positioned on the tray brackets 156, a lid 110 may be positioned on the top surface 160 of the upper flange 140 to close the assembly. The top surface 162 of the lid 110 completes a walkable surface established by the luminaire 100 and the Underwriters Lab (UL) required electrical enclosure.

The lid 110 may be removably secured to the upper flange 140 by one or more fasteners extending through associated openings in the top surface 162 the lid 110 and into associated openings in the top surface 160 of the upper flange 140. In the illustrated example embodiment, the lid 110 is sized to encompass the upper flange 140 and includes a cut-out 164 in a corner thereof to allow power cables to extend into the opening 158 of the upper flange 140.

The lid 110 may be rigid member and, in some embodiments, may have a walkable load rating of greater than or equal to about 20 pounds (lbs.) per-square-foot (p/sf) or more to allow a person to walk on, or stand on, the top surface 162 of the lid 110 without collapsing the lid 110 downwardly. This allows a person perform maintenance, repair, etc. of equipment in a space above the ceiling panel 114 without concern over stepping on the top surface of the lid 110. The walkable load rating for the lid 110 may depend on the size and/or shape of the lid 110 and the span of the lid 110 between support members of the ceiling. In some embodiments, the lid 110 may have a walkable load rating greater than about 30 lbs. p/sf, about 40 lbs. p/sf, about 50 lbs. p/sf, about 60 lbs. p/sf, about 70 lbs. p/sf, about 80 lbs. p/sf, about 90 lbs. p/sf, or about 100 lbs./sf, or any increment therebetween. In some embodiments, the lid 110 may have a walkable load rating between about 100 p/sf and about 200 p/sf.

The lid 110 may have a generally planar configuration. The luminaire 100 may thus extend upwardly from the top surface 130 of the panel 114 only by the combined thickness of the upper flange 140, the hanger flange 126, the lid 110 and the head of any fasteners used to couple the lid 110 to the upper flange 140. This substantially avoids creating a tripping hazard for personnel walking in the space above the panel 114. The lid 110 may also, or alternatively, be removable from the upper flange 140 to allow for repair, maintenance, etc. of the luminaire 100, e.g., of the electronics on the electronics tray 108.

Figure 5:
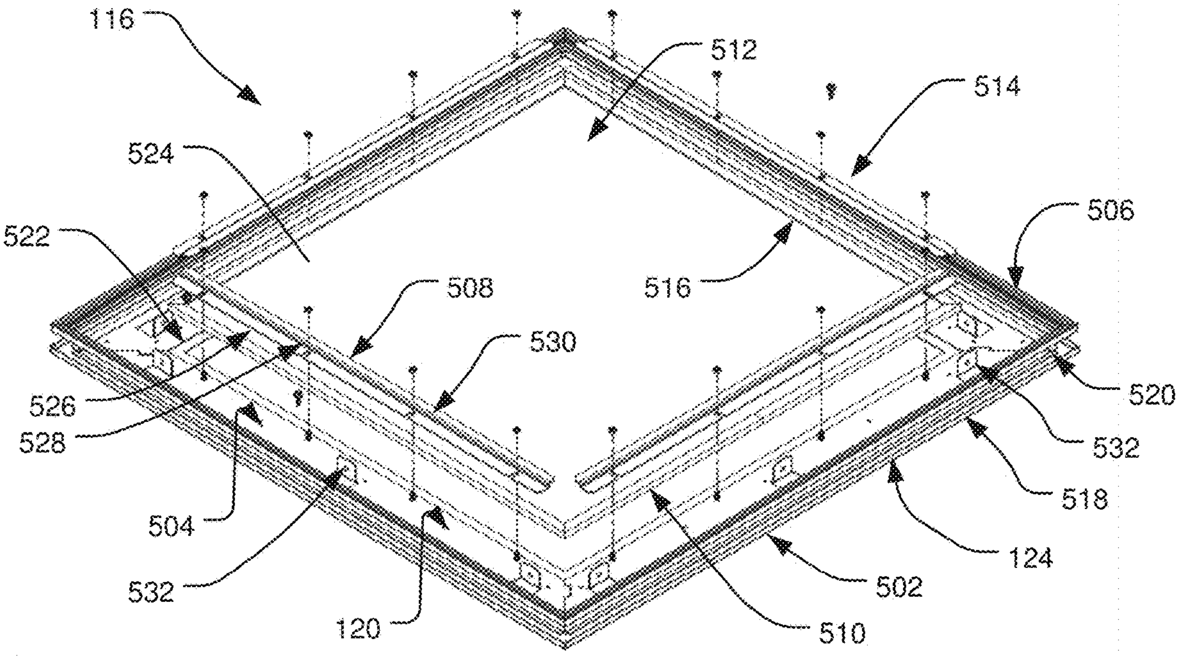
FIG. 5 is an exploded view of a lower flange assembly of the luminaire shown in FIG. 1.

Turning to FIG. 5, the lower flange 116 includes a base 502, a base bracket 504, a flange gasket 506, a diffuser bracket 508, and a diffuser gasket 510. The base 502 defines a central opening 512, exterior perimeter 514, and an interior perimeter 516. The base 502 may have a spot welded steel construction and may include an upwardly extending perimeter wall 518 around the exterior perimeter 514 formed, for example, by bending the base material upwardly around the exterior perimeter 514 of the base 502. In the illustrated example embodiment, the base 502 includes four separate linear sections. Each of the sections defines an associated side of the base 502 and each is positioned with ends in contact with the adjacent linear sections. Alternatively, the base 502 may include one or more continuous sections extending.

The base bracket 504 may be provided on the top surface of the base 502 and, for example, spot welded thereto. The base bracket 504 defines a base bracket wall 520 adjacent to the exterior perimeter wall 518. A space for receiving the flange gasket 506 is thus provided between the exterior perimeter wall 518 and the base bracket wall 520.

The flange gasket 506 may extend around the exterior perimeter 514 of the base 502 and may be captivated in the space between the perimeter wall 518 and the base bracket wall 520. The flange gasket 506 may be constructed from any known gasketing material, including but not limited to silicone rubber, neoprene, ethylene propylene diene monomer (EPDM), foam, or styrene-butadiene (SBR) rubber. The flange gasket 506 may extend upwardly from the perimeter wall 518 whereby when the lower flange 116 is forced against the bottom surface 122 of the ceiling panel 114 the flange gasket 506 compresses against the bottom surface 122 of the ceiling panel 114 to establish a seal between the bottom surface 122 of the ceiling panel 114 and the base 502.

In the illustrated example embodiment, the flange gasket 506 includes four separate linear sections. Each of the sections is provided along an associated side of the base 502 and each is positioned with ends in contact with the adjacent linear sections. Alternatively, the flange gasket 506 may include one or more continuous sections extending around the base 502.

A recessed interior perimeter groove 522 is provided in the top surface of the base 502 receiving a perimeter of a diffuser 524. The diffuser 524 may span the central opening 512 by the base 502. The diffuser 524 is translucent and configured for diffusing light emitted by the lamps 150 of the electronics tray 108 and acts as a solid barrier for preventing contaminants from entering or exiting the containment environment through the luminaire 100. The diffuser 524 may be constructed from any known diffusing material, including but not limited to polycarbonate, acrylic, or glass and may be provided, for example, in frosted or micro-prismatic forms.

Figure 6:
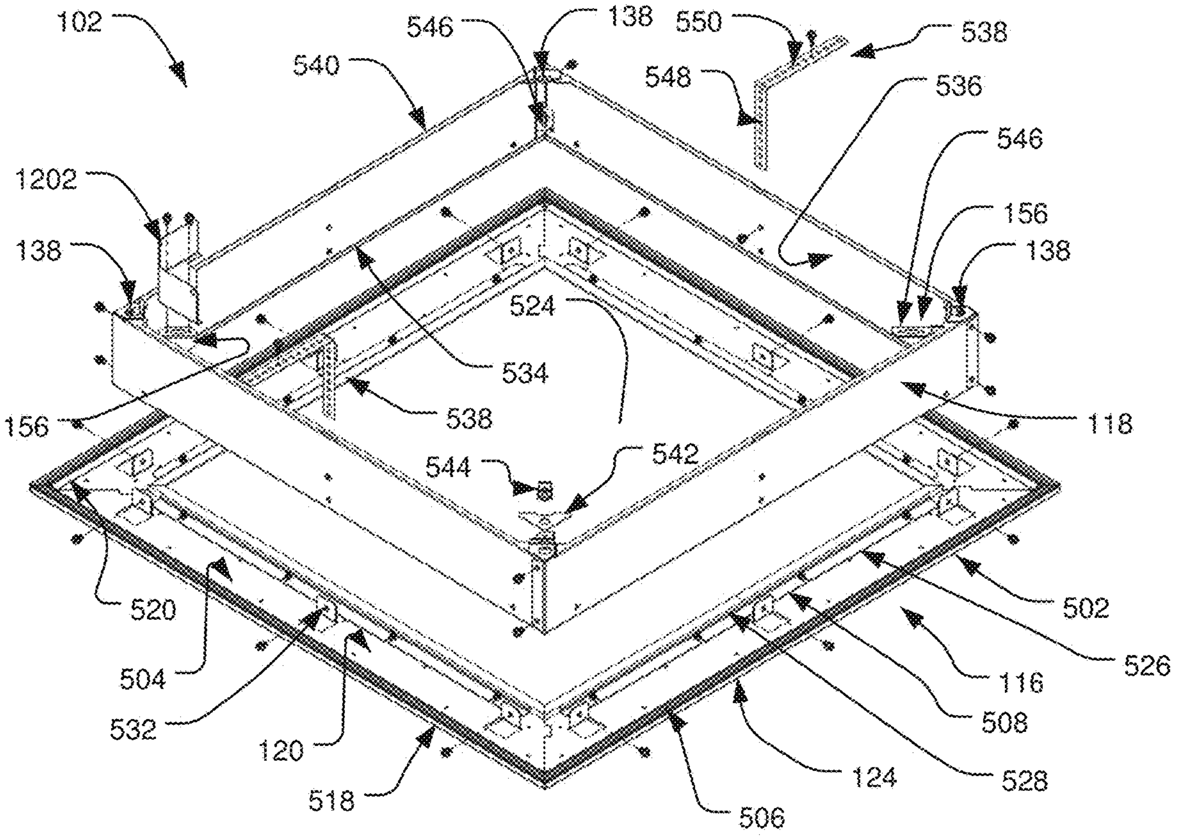
FIG. 6 is an exploded view of a lower assembly shown in FIG. 1.

With reference also to FIG. 6, the diffuser gasket 510 may be disposed on the diffuser 524 and extend around the interior perimeter 516 of the base 502. The diffuser gasket 510 may be constructed from any known gasketing material, including but not limited to silicone rubber, neoprene, ethylene propylene diene monomer (EPDM), foam, or styrene-butadiene (SBR) rubber. In the illustrated example embodiment, the diffuser gasket 510 includes four separate linear sections. Each of the sections is provided along an associated side of the interior perimeter 516 and each is positioned with ends in contact with the adjacent linear sections. Alternatively, the diffuser gasket 510 may include one or more continuous sections extending around the perimeter wall 518.

In the illustrated example embodiment, the diffuser bracket 508 includes a planar connector portion 526, a wall 528 extending upwardly from an interior side of the connector portion 526, and an inwardly extending projection 530 extending inwardly from a top of the wall 528. The diffuser bracket 508 may be constructed from a metal material, including but not limited to steel or aluminum. The diffuser bracket 508 may be positioned with the diffuser gasket 510 disposed between the diffuser 524 and the bottom surface of the inwardly extending projection 530 of the diffuser bracket 508. The connector portion 526 of the diffuser bracket 508 is secured to the base 502 using fasteners with press fit studs and associated nuts. The press fit studs do not extend through the base 502. When the connector portion 526 is coupled to the base 502, the diffuser gasket 510 and the diffuser 524 are captured between the inwardly extending projection 530 of the diffuser bracket 508 and the groove 522 thus securing the diffuser 524 to the lower flange 116 and compressing the diffuser gasket 510 against the diffuser 524 to establish a seal between the diffuser 524 and the base 502.

In the illustrated example embodiment, the diffuser bracket 508 includes four separate linear sections. Each of the sections is provided along an associated side of the interior perimeter 516 of the base 502 adjacent the groove 522 and each is positioned with ends in contact with the adjacent linear sections. Alternatively, the diffuser bracket 508 may include one or more continuous sections extending around the interior perimeter 516 of the base 502 adjacent the groove 522.

In the illustrated example embodiment, the lower flange 116 includes a plurality of wall brackets 532. In the illustrated example embodiment, the wall brackets 532 are defined by a portion of the base bracket 504 that is bent upwardly from the base bracket 504. In other embodiments, the wall brackets 532 include a first leg coupled to the top surface of the base 502, e.g., by a spot weld, and a second leg extending upwardly from the first leg. Each wall bracket 532 includes a fastener opening extending therethrough.

A bottom 534 of the lower wall 118 may be placed on the base 502 with the wall positioned between the wall brackets 532 and the diffuser gasket 510. The lower wall 118 may be secured to the base 502 by fasteners extending through the fastener openings of the wall brackets 532 and corresponding fastener openings in the lower wall 118. In the illustrated example embodiment, the lower wall 118 is provided in four separate linear sections. Each of the sections is provided along an associated side of the interior perimeter 516 and each is positioned with ends in contact with the adjacent linear sections. Alternatively, the lower wall 118 may include one or more continuous sections extending around the perimeter wall.

The lower wall 118 creates a perimeter between the flange gasket 506 and the diffuser 524 and acts in tension when the luminaire 100 is assembled in an opening 112 in a panel 114 to keep the flange gasket 506 compressed against the bottom surface 122 of the panel 114. The lower wall 118 also includes the tray brackets 156 for supporting the electronics tray 108 and shields the luminaire 100 from any particulate shed from the panel 114, e.g., foam particulates shed from a foam core of an IMP. The interior surface 536 of the lower wall 118 reflects incident light emitted from the lamps 150 of the electronics tray 108 toward the diffuser 524 and outwardly from the luminaire 100

With continued reference to FIG. 6, the lower wall 118 includes the lower wall fastener mounts 138, the tray brackets 156, first and second installation supports 538. In the illustrated example embodiment, the lower wall fastener mounts 138 extend inwardly at the top 540 of the lower wall 118 and in the corners of the lower wall 118. Each of the lower wall fastener mounts 138 defines a fastener opening for receiving the hanger fastener 136. A triangular washer 542 and a captive nut 544 are coupled to and aligned with the fastener opening for receiving the hanger faster 136. The respective sides of the triangular washer 542 engage the lower wall 118 to distribute the load incident on the captive nut 544 by the hanger fastener 136 on adjacent sides of the lower wall 118.

The tray brackets 156 extend inwardly from the lower wall 118 at a position below the lower wall fastener mounts 138 and in the corners of the lower wall 118. In the illustrated example embodiment, tray brackets 156 are generally triangular with a tray platform 546 at an apex of the triangle. The bottom surface 304 of the base 148 of the electronics tray 108 is supported by the tray platforms 546 of the tray brackets 156.

Figure 11:
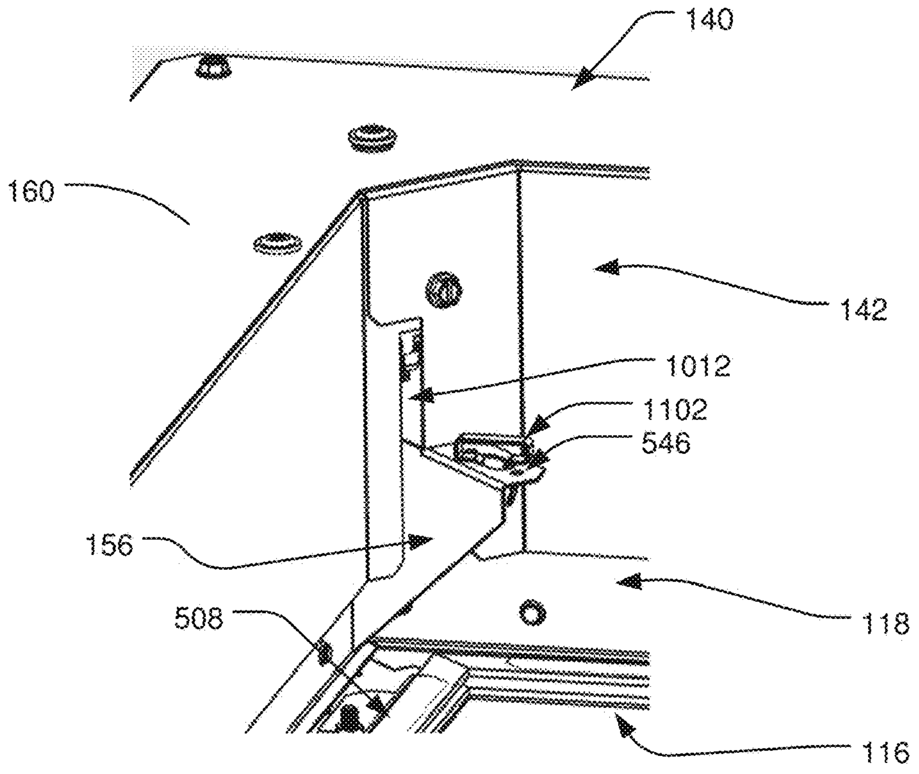
FIG. 11 shows a corner portion of the lower assembly shown in FIG. 6 mated with the upper assembly shown in FIG. 10.
Figure 13:
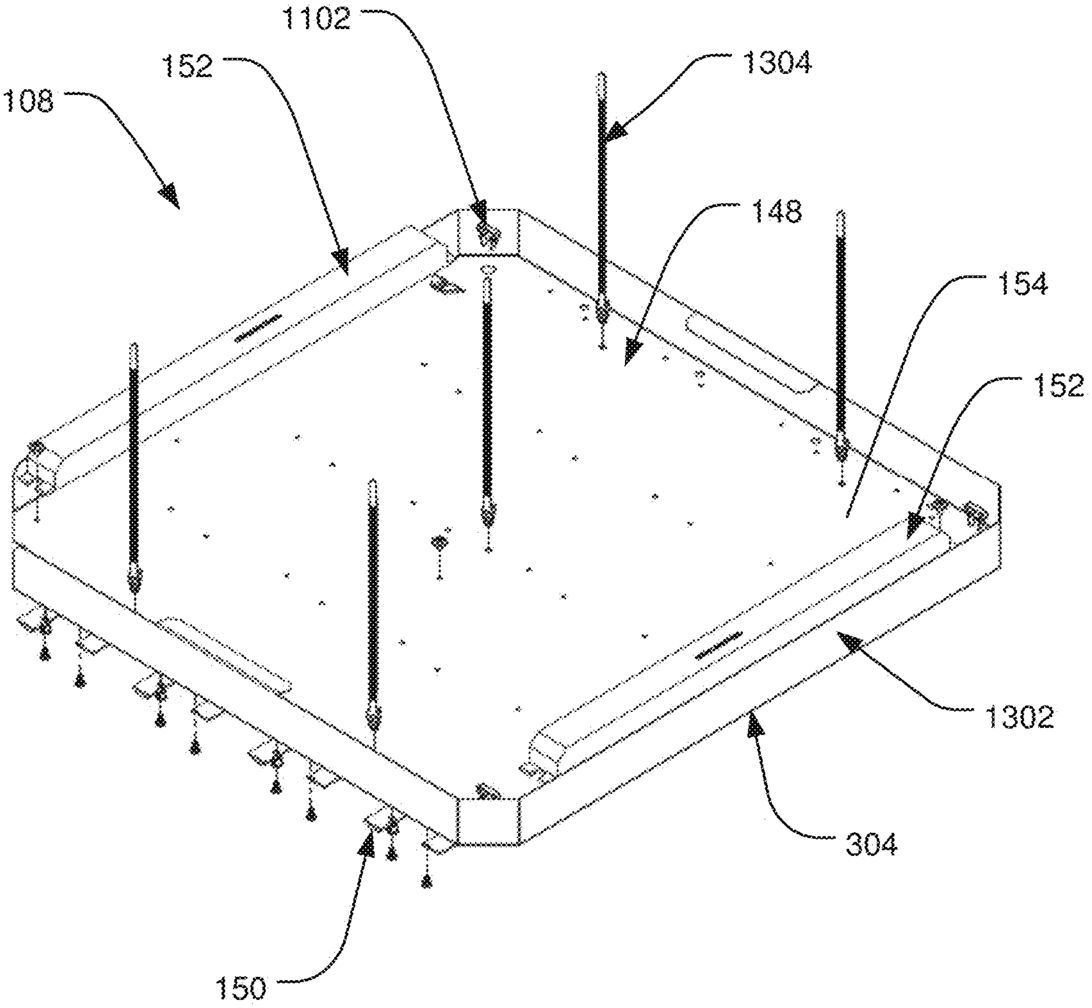
FIG. 13 is a top perspective view the electronics tray of the luminaire shown in FIG. 1.

Each tray platform 546 has a top surface that is generally parallel to the bottom surface 124 of the lower flange 116 and is positioned at a fixed distance D (FIG. 4) from the bottom surface 124 of the lower flange 116, which in the illustrated example embodiment is the bottom surface of the diffuser 524. The distance D is constant regardless of the thickness Tp (FIG. 4) of the panel 114 to provide a desired quality of light and optical efficiency of the light output for the luminaire 100. Each of the tray platforms 546 defines a fastener opening for receiving an associated tray fastener 1102 (FIGS. 11 and 13). The tray fasteners 1102 may extend through the electronics tray 108 and into the fastener opening in the associated tray platform 546 to secure the electronics tray 108 to the tray brackets 156.

The installation supports 538 have a first leg 548 coupled to an interior surface 536 of the lower wall 118, e.g., by an associated fastener, and a second leg 550 extending upwardly above the lower wall 118 and extending outwardly therefrom. In the illustrated example embodiment, first and second installation supports 538 are configured as L-shaped straps constructed from metal strapping and are positioned on opposite sides of the lower wall 118. It is to be understood however that the installation supports 538 may be provided in a variety of configurations and any number of installation supports 538 may be provided in a luminaire 100 consistent with the present disclosure.

Figure 7:
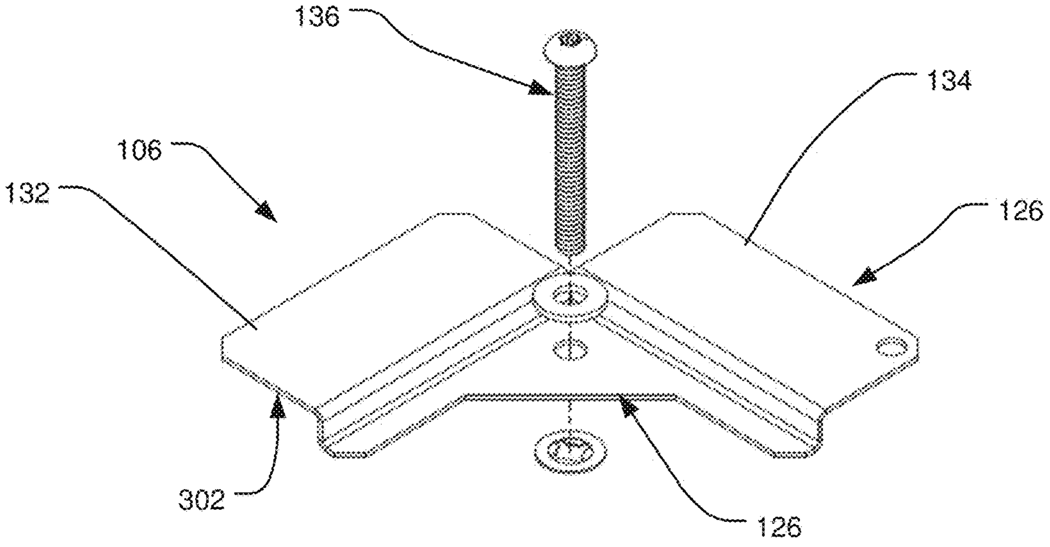
FIG. 7 is an exploded view of one example of a hanger of the luminaire shown in FIG. 1.
Figure 8:
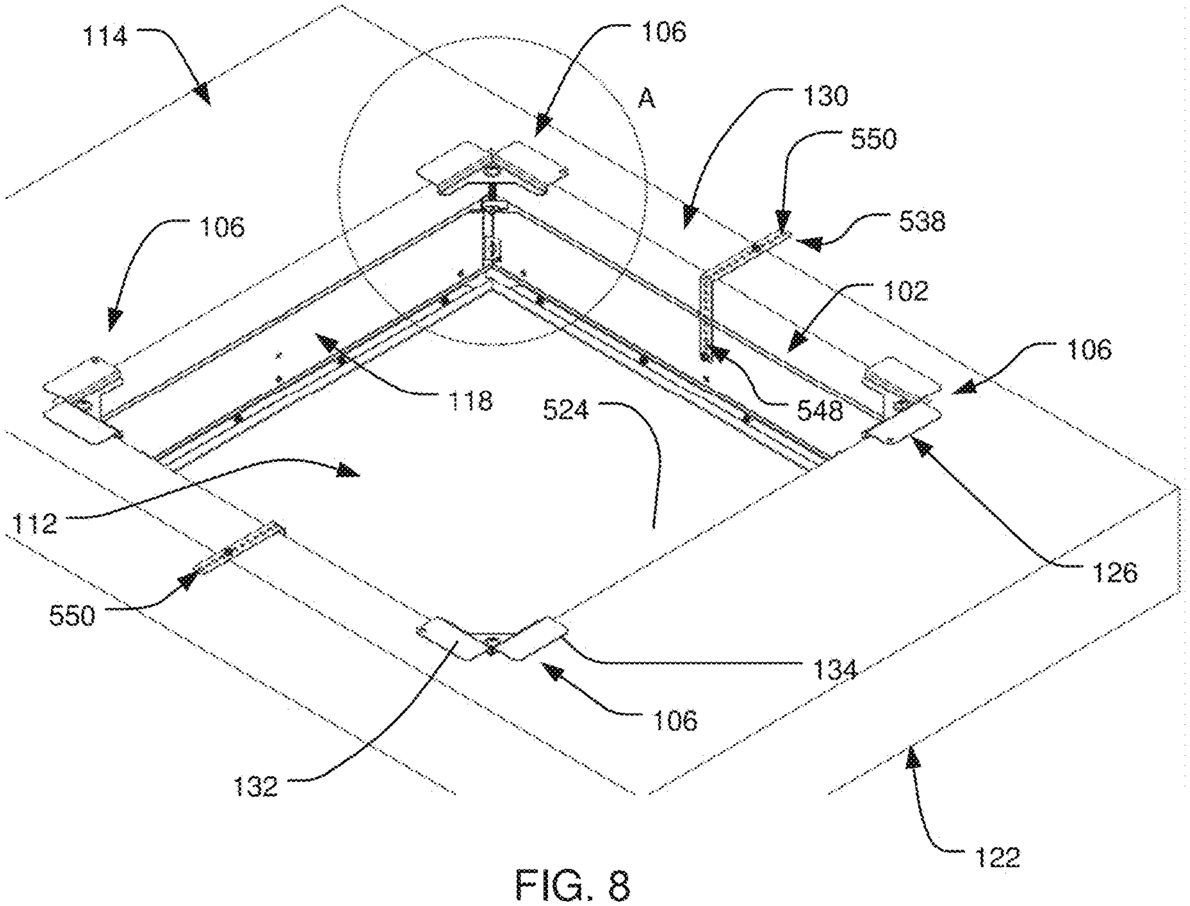
FIG. 8 top perspective view of the lower assembly shown in FIG. 1 and the hanger shown in FIG. 7 installed in a portion of a panel consistent with the present disclosure.
Figure 9:
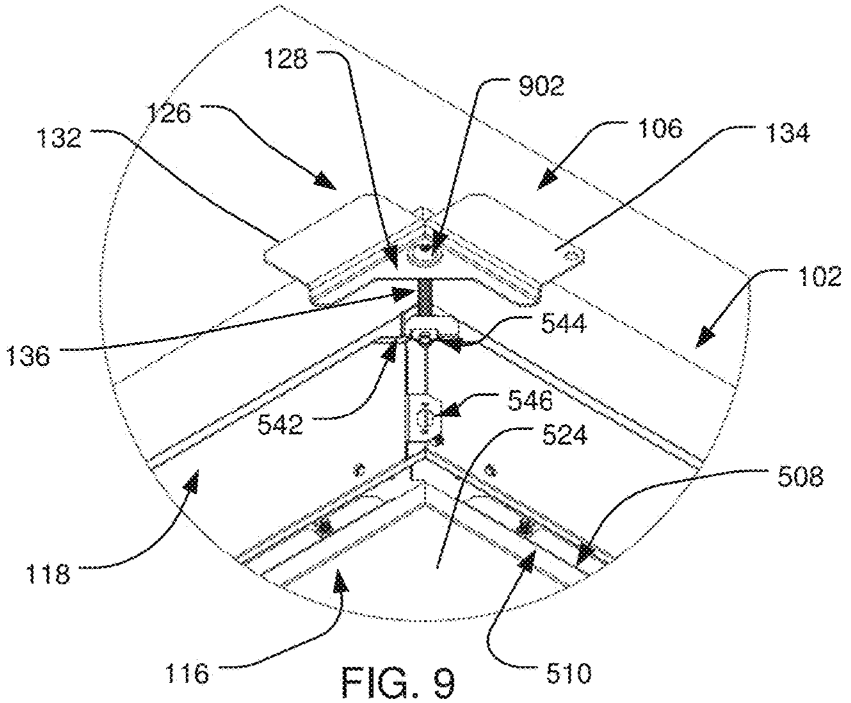
FIG. 9 is close-up view of the portion included in the circle A in FIG. 8.

Turning now to FIGS. 7-9, to assist installation of the lower assembly 102 within the opening 112, the second legs 550 of the installation supports 538 may be fastened to the top surface 130 of the panel 114 to suspend the lower assembly 102 on the panel 114 with the lower wall fastener mounts 138 in an approximate position for coupling to the hangers 106. The hangers 106 include the hanger flange 126 and the hanger fastener mount 128 and may be constructed from bent metal, including but not limited to steel. When the hanger fastener 136 is passed, e.g. threaded, through the hanger fastener mount 128, the clip nut, 544 the triangular washer 542 and lower wall fastener mount 138, the lower assembly 102 is secured to the panel 114 and the flange gasket 506 on the lower flange 116 is compressed against the bottom surface 122 of the panel 114 to establish the seal between the lower flange 116 and the ceiling panel 114. The hanger fastener 136 may be provided with a known tamper-resistant head 902 to limit the possibility of accidental adjustments after the luminaire 100 is installed to the panel 114.

Figure 10:
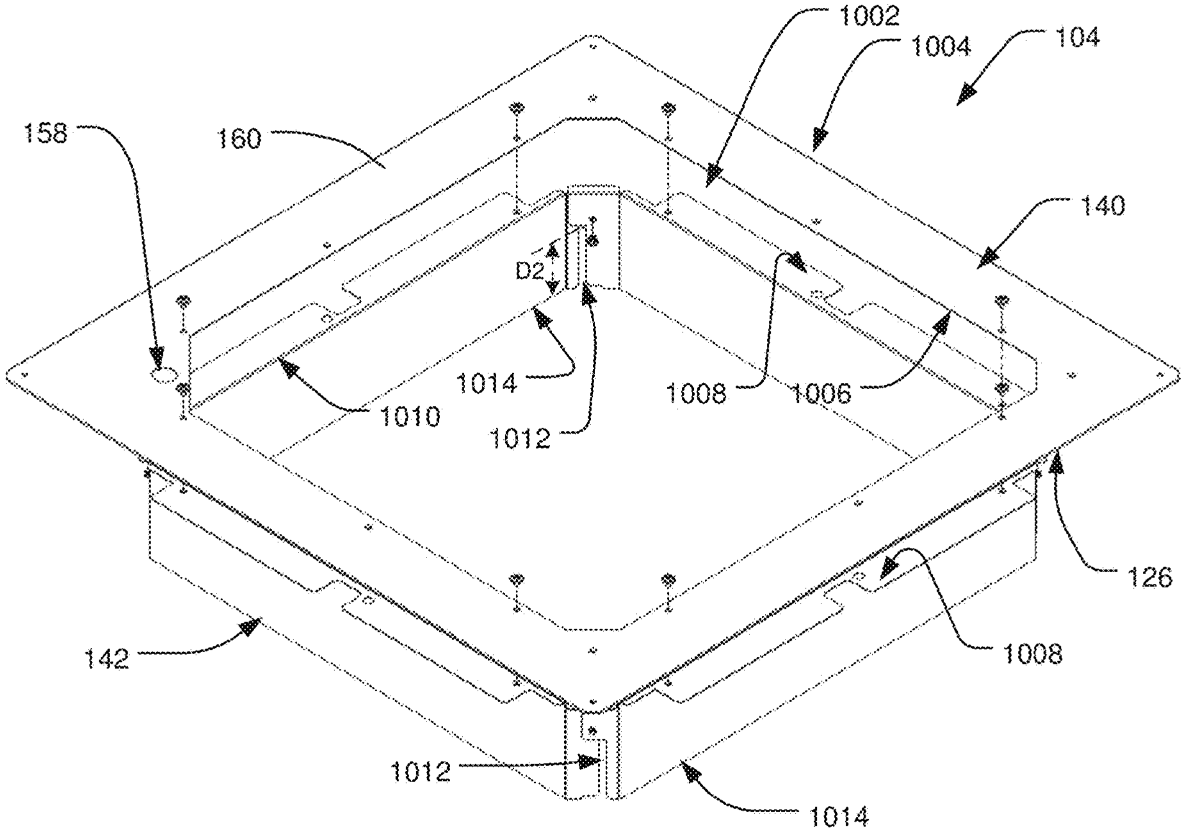
FIG. 10 is an exploded view of an upper assembly of the luminaire shown in FIG. 1.

As shown in FIG. 10, the upper assembly 104 includes the upper flange 140 and the upper wall 142. The upper flange 140 defines a central opening 1002, an exterior perimeter 1004, and an interior perimeter 1006. The upper flange 140 may have a spot welded steel construction and may have a generally planar top surface 160 to avoid tripping hazards when personnel are walking in a space above a ceiling where the luminaire 100 is installed. In the illustrated example embodiment, the upper flange 140 is constructed from a single continuous piece of material, e.g., steel. Alternatively, the upper flange 140 may be constructed from two or more separate sections. The upper flange 140 provides a secure location through which power is supplied to the electronics tray 108, i.e., through the opening 158, covers any sharp edges along the opening 112 in the panel 114, and contains an particulates shed by the panel 114, e.g., foam particulates from an IMP panel.

The upper wall 142 extends downwardly from a bottom surface 144 of the upper flange 140 adjacent the interior perimeter of the upper flange 140. In the illustrated example embodiment, the upper wall 142 includes four separate sections. Each of the sections is provided along an associated side of the interior perimeter 1006 of the upper flange 140 and each is positioned with ends in contact with the adjacent sections. Alternatively, the upper wall 142 may include one or more continuous sections extending around the interior perimeter 1006. The upper wall 142 structurally reinforces the upper flange 140, completes UL required electrical enclosure for the luminaire 100, and shields the inside of the luminaire 100 from particulates shed from the panel 114.

In the illustrated example embodiment, a connector flange 1008 extends outwardly from a top 1010 of the upper wall 142 at a substantially right angle thereto. The upper flange 140 may be secured to the upper wall 142 by fasteners extending through associated openings in the upper flange 140 and corresponding openings in the connector flange 1008.

The upper wall 142 defines tray bracket slots 1012 in the corners thereof extending through the upper wall 142 and upwardly from a bottom 1014 of the upper wall 142 by a distance D2. As shown in FIG. 11, for example, when the upper assembly 104 is installed in the panel 114, the upper wall 142 extends downwardly into the opening 112 in the panel 114 adjacent to the lower wall 118 and the tray brackets 156 on the lower wall 118 extend into the tray bracket slots 1012 in the upper wall 142. This facilitates a continuously adjustable positioning, i.e., vertical translation, of the upper assembly 104 with respect to the lower assembly 102 to adjust the thickness T1 (FIG. 4) of the luminaire to allow the luminaire 100 to be installed in panels having a range of thicknesses Tp (FIG. 4). In some embodiments, for example, luminaires 100 consistent with the present disclosure may be adjustable in thickness T1 for mounting the luminaires 100 in panels having a range of thicknesses Tp from about 60-200 millimeters (mm). For example, one luminaire consistent with the present disclosure may be configured for mounting in panels ranging from about 60-120 mm and another luminaire consistent with the present disclosure may be configured for mounting in panels ranging from 120-200 mm. The hangers 106 keep the upper assembly 104 roughly centered in the opening 112 in the panel 114 as the upper assembly 104 is lowered downwardly toward the lower assembly 102.

Figure 12:
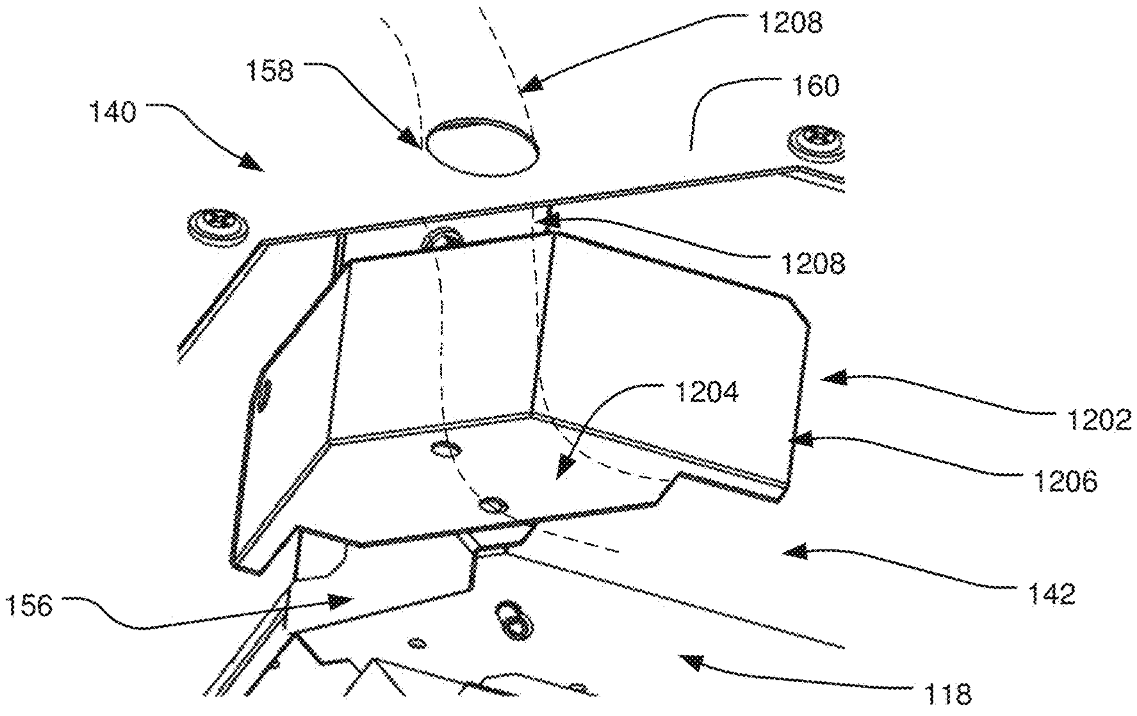
FIG. 12 is another corner view of the lower assembly shown in FIG. 6 mated with the upper assembly shown in FIG. 10.

A discussed herein, the electronics tray 108 is supported on the tray brackets 156 of the lower wall 118 and power to the electronics tray 108 is coupled through the opening 158 to the electronics tray 108. In the illustrated example embodiment, a wire guard 1202 is secured in the corner of the upper assembly 104 adjacent to the opening 158 for guiding power cables received through the opening 158 to the electronics tray 108. As shown in FIG. 12 the wire guard 1202 may have a bottom wall 1204 extending inwardly from the corner of the upper assembly 104 and an upper wall 1206 extending upwardly from a rear of the bottom wall 1204 toward the upper flange 140. A power cable entering the opening 158 may contact the bottom wall 1204 of the wire guard 1202 and be redirected by the bottom wall 1204 toward the electronics tray 108 for electrical coupling thereto, e.g., using a known quick-disconnect connector to allow for toolless removal of the electronics tray 108 from the assembly for repair, maintenance, replacement, etc. The wire guard 1202 may also complete a UL-required electrical enclosure.

As shown particularly in FIG. 13, the electronics tray 108 in the illustrated example embodiment includes the base 148 and an upwardly extending perimeter wall 1302 extending around the perimeter of the base 148. One or more cable ties 1304 may be provided for securing wiring connections to electrical components of the electronics tray 108. The lamps 150 may be electrically coupled to the drivers 152 and may be provided in rows and coupled to the bottom surface 304 of the base 148 and secured thereto by associated fasteners. The electronics tray 108 may be removably coupled to the tray brackets 156 using the tray fasteners 1102, e.g., known clips, to allow for toolless removal of the electronics tray 108 from the assembly for repair, maintenance, replacement, etc.

Once the electronics tray 108 is positioned on, and coupled to, the tray brackets 156 and electrical power is coupled to the electronics tray 108, the lid 110 is coupled to the top surface 160 of the upper flange 140 to complete the luminaire 100 assembly. When the luminaire 100 assembled the upper assembly 104 and the lid 110 are structurally separate from the lower assembly 102, i.e., they are not directly coupled to the lower assembly 102 by a fastener, and act as a load bearing assembly providing a walkable load rating. The load path from incident mechanical load on the top surface 162 of the lid 110 and/or the upper flange 140 is thus transferred directly to the panel 114 and bypasses the lower assembly 102.

There is thus provided a luminaire 100 including several advantageous features that may be implemented alone or in combination in a luminaire consistent with the present disclosure. For example, the upper 142 and lower 118 walls are freely vertically adjustable relative to each other allowing adjustment of the thickness of the luminaire 100 to allow the luminaire be installed in panels having a range of thicknesses. The lower assembly 102 is coupled to the panel 114 using a hanger 106, which avoids the need for penetrations or perforations that would allow contaminants to bypass gaskets, e.g., gaskets 506, 510, in the luminaire 100. The luminaire 100 also provides a walkable load rating on a top thereof and avoids a trip hazard by extending only slightly above a top surface 130 of a panel 114 in all panel thicknesses within a range. Access to the luminaire 100 is provided from the top surface 130 of the ceiling panel 114 to limit disruption and contamination of a containment area during servicing. Also, the electronics tray 108 may be toollessly removed from the assembly.

Numerous embodiments will be apparent in light of this disclosure. One example embodiment provides a luminaire including a lower assembly including a lower flange for positioning against bottom surface of a panel and around a perimeter of an opening in the panel, a lower wall extending upward from the lower flange and configured to extend upwardly into the opening in the panel, and at least one lower wall fastener mount extending inwardly from the lower wall and defining a fastener opening; at least one hanger comprising a hanger flange configured to engage a top surface of the panel and comprising a hanger fastener mount configured to receive a hanger fastener extending downwardly through the hanger fastener mount and into the fastener opening to place the lower flange under tension against the bottom surface of the panel; and an upper assembly comprising an upper flange for positioning against the top surface of the panel and around the perimeter of the opening in the panel, and an upper wall extending downwardly from the upper flange and configured to extend downwardly into the opening of the panel, the lower wall and upper wall being vertically adjustable relative to each other to adjust a thickness of the luminaire to allow the luminaire to be installed in panels having a range of thicknesses.

Another example embodiment provides a luminaire including: a lower assembly including a lower flange for positioning against a bottom surface of a panel and around a perimeter of an opening in the panel, a lower wall extending upward from the lower flange adjacent an interior perimeter of the lower flange and configured to extend upwardly into the opening in the panel, at least one lower wall fastener mount extending inwardly from the lower wall and defining a fastener opening, and at least one tray bracket extending inwardly from the lower wall; at least one hanger comprising a hanger flange configured to engage a top surface of the panel, and a hanger fastener mount extending inwardly and downwardly from the hanger flange, the hanger fastener mount configured to receive a hanger fastener extending downwardly through the hanger fastener mount and into the fastener opening to place the lower flange under tension against the bottom surface of the panel; an upper assembly comprising an upper flange for positioning against the top surface of the panel and around the perimeter of the opening in the panel, and an upper wall extending downwardly from the upper flange adjacent an interior perimeter of the upper flange and configured to extend downwardly into the opening of the panel, the upper wall all defining at least one tray bracket slot extending through the upper wall and upwardly from a bottom of the upper wall, the lower wall and upper wall being vertically adjustable relative to each other with the at least one tray bracket positioned in the at least one tray bracket slot to adjust a thickness of the luminaire to allow the luminaire to be installed in panels having a range of thicknesses; an electronics tray including at least one lamp disposed thereon for emitting light outwardly from the lower assembly, the at least one electronics tray being supported on the at least one tray bracket; and a lid disposed on a top surface of the upper flange, the lid having a walkable load rating whereby a top surface of the lid is a walkable surface.

Another example embodiment provides a method of installing a luminaire in an opening in ceiling panel, the method including: positioning a lower assembly in the opening with a lower flange of the lower assembly adjacent a bottom surface of the ceiling panel and a lower wall of the lower assembly extending upwardly into the opening; positioning a flange of a hanger on a top surface of the panel; passing a hanger fastener through the hanger and into a lower wall fastener mount extending inwardly from the lower wall to place the lower flange under tension against the bottom surface of the panel; positioning an upper assembly in the opening with an upper flange of the upper assembly positioned adjacent a top surface of the ceiling panel and an upper wall of the upper assembly extending downwardly into the opening; and vertically adjusting the upper wall relative to the lower wall to adjust a thickness of the luminaire for mounting in the panel.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

It is, therefore, to be understood that the foregoing embodiments are presented by way of example only and that, within the scope of the appended claims and equivalents thereto, the invention may be practiced otherwise than as specifically described and claimed. The present invention is directed to each individual feature, embodiment, system, article, material, kit, and/or method described herein. In addition, any combination of two or more such features, embodiments, systems, articles, materials, kits, and/or methods, if such features, systems, articles, materials, kits, and/or methods are not mutually inconsistent, is included within the scope of the present invention.

The phrase "and/of" as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/of" clause, whether related or unrelated to those elements specifically identified, unless clearly indicated to the contrary.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

As used herein, use of the term "nominal" or "nominally" when referring to an amount means a designated or theoretical amount that may vary from the actual amount.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer or section could be termed a second element, component, region, layer or section without departing from the scope and teachings of the present invention.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A luminaire comprising:

a lower assembly comprising a lower flange for positioning against bottom surface of a panel and around a perimeter of an opening in the panel, a lower wall extending upward from the lower flange and configured to extend upwardly into the opening in the panel, and at least one lower wall fastener mount extending inwardly from the lower wall and defining a fastener opening;

an electronics tray comprising at least one lamp disposed thereon for emitting light outwardly from the lower assembly;

at least one hanger comprising a hanger flange configured to engage a top surface of the panel and comprising a hanger fastener mount configured to receive a hanger fastener extending downwardly through the hanger fastener mount and into the fastener opening to place the lower flange under tension against the bottom surface of the panel; and an upper assembly comprising an upper flange for positioning against the top surface of the panel and around the perimeter of the opening in the panel, and an upper wall extending downwardly from the upper flange and configured to extend downwardly into the opening of the panel, the lower wall and upper wall being vertically adjustable relative to each other to adjust a thickness of the luminaire to allow the luminaire to be installed in panels having a range of thicknesses.

2. The luminaire of claim 1, wherein the range of thicknesses is about 60-200 millimeters (mm).

3. The luminaire of claim 1, the lower assembly further comprising at least one tray bracket extending inwardly from the lower wall.

4. The luminaire of claim 3, the upper wall defining at least one tray bracket slot extending through the upper wall and upwardly from a bottom of the upper wall, the at least one tray bracket slot being configured for receiving the at least one tray bracket.

5. The luminaire of claim 3, wherein the at least one tray bracket comprises a tray bracket platform having a top surface extending substantially parallel to a bottom surface of the lower flange.

6. The luminaire of claim 1, wherein the hanger fastener mount extends inwardly and downwardly from the hanger flange.

7. The luminaire of claim 1, wherein the hanger flange comprises first and second legs disposed at substantially a right angle to each other.

8. The luminaire of claim 1, wherein the upper wall is configured to extend downwardly into the opening in the panel for positioning the lower wall between the upper wall and an interior surface of the opening in the panel.

9. The luminaire of claim 1, the lower assembly further comprising at least one tray bracket extending inwardly from the lower wall, the electronics tray being supported on the at least one tray bracket.

10. The luminaire of claim 9, the upper wall defining at least one tray bracket slot extending through the upper wall and upwardly from a bottom of the upper wall, the at least one tray bracket slot being configured for receiving the at least one tray bracket.

11. The luminaire of claim 1, wherein the upper flange comprises an opening therein for receiving a power cable extending to the electronics tray.

12. The luminaire of claim 11 further comprising a wire guard having a bottom wall configured to direct the power cable toward the electronics tray.

13. The luminaire of claim 1 further comprising a lid disposed on a top surface of the upper flange, the lid having a walkable load rating whereby a top surface of the lid is a walkable surface.

14. The luminaire of claim 13, wherein the walkable load rating is greater than or equal to about 20 pounds per-square-foot.

15. The luminaire of claim 13, wherein upper assembly is structurally separate from the lower assembly, whereby a load on the top surface of the lid is not transferred to the lower assembly.

16. The luminaire of claim 1 further comprising a triangular washer aligned with the fastener opening for receiving the hanger fastener.

17. The luminaire of claim 1, the lower assembly further comprising at least one installation support, the at least one installation support comprising a leg extending upwardly above the lower wall and outwardly from the lower wall, the leg configured to rest on the top surface of the panel for supporting the lower assembly on the panel during installation of the luminaire.

18. A luminaire comprising:

a lower assembly comprising a lower flange for positioning against a bottom surface of a panel and around a perimeter of an opening in the panel, a lower wall extending upward from the lower flange adjacent an interior perimeter of the lower flange and configured to extend upwardly into the opening in the panel, at least one lower wall fastener mount extending inwardly from the lower wall and defining a fastener opening, and at least one tray bracket extending inwardly from the lower wall;

at least one hanger comprising a hanger flange configured to engage a top surface of the panel, and a hanger fastener mount extending inwardly and downwardly from the hanger flange, the hanger fastener mount configured to receive a hanger fastener extending downwardly through the hanger fastener mount and into the fastener opening to place the lower flange under tension against the bottom surface of the panel;

an upper assembly comprising an upper flange for positioning against the top surface of the panel and around the perimeter of the opening in the panel, and an upper wall extending downwardly from the upper flange adjacent an interior perimeter of the upper flange and configured to extend downwardly into the opening of the panel, the upper wall all defining at least one tray bracket slot extending through the upper wall and upwardly from a bottom of the upper wall, the lower wall and upper wall being vertically adjustable relative to each other with the at least one tray bracket positioned in the at least one tray bracket slot to adjust a thickness of the luminaire to allow the luminaire to be installed in panels having a range of thicknesses;

an electronics tray comprising at least one lamp disposed thereon for emitting light outwardly from the lower assembly, the at least one electronics tray being supported on the at least one tray bracket; and a lid disposed on a top surface of the upper flange, the lid having a walkable load rating whereby a top surface of the lid is a walkable surface.

* * * * *